(12) United States Patent
Ljunggren et al.

(10) Patent No.: US 9,098,869 B2
(45) Date of Patent: Aug. 4, 2015

(54) DYNAMIC PAYMENT METHODS AND DEVICES

(75) Inventors: Andreas Ljunggren, Vallingby (SE); Mikael Lind, Sollentuna (SE); Helena Lind, Sollentuna (SE); Ola Smith, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 251 days.

(21) Appl. No.: 12/996,703

(22) PCT Filed: Jun. 25, 2008

(86) PCT No.: PCT/SE2008/050774
§ 371 (c)(1),
(2), (4) Date: Feb. 17, 2011

(87) PCT Pub. No.: WO2009/157830
PCT Pub. Date: Dec. 30, 2009

(65) Prior Publication Data
US 2011/0145111 A1    Jun. 16, 2011

(51) Int. Cl.
*G06Q 40/00* (2012.01)
*G06Q 40/06* (2012.01)
*G06Q 40/04* (2012.01)
*G06Q 30/06* (2012.01)
*G06Q 30/04* (2012.01)
*G06Q 20/10* (2012.01)

(52) U.S. Cl.
CPC ............. *G06Q 30/04* (2013.01); *G06Q 20/10* (2013.01); *G06Q 40/12* (2013.01)

(58) Field of Classification Search
USPC ........ 726/3; 705/26, 34, 26.41, 26.81, 30, 35, 705/65
See application file for complete search history.

(56) References Cited

U.S. PATENT DOCUMENTS

| | | | |
|---|---|---|---|
| 7,340,436 B1 * | 3/2008 | Lilge | 705/53 |
| 2002/0029197 A1 * | 3/2002 | Kailamaki et al. | 705/40 |
| 2002/0073044 A1 * | 6/2002 | Singhal | 705/64 |
| 2003/0121967 A1 | 7/2003 | Goldberg et al. | |
| 2005/0071512 A1 * | 3/2005 | Kim et al. | 710/1 |
| 2005/0131814 A1 * | 6/2005 | Jakstadt et al. | 705/39 |
| 2007/0180496 A1 * | 8/2007 | Fransdonk | 726/3 |
| 2008/0027839 A1 * | 1/2008 | O'Regan et al. | 705/34 |

(Continued)

FOREIGN PATENT DOCUMENTS

| | | |
|---|---|---|
| EP | 1 437 669 A1 | 7/2004 |
| EP | 1 450 320 A1 | 8/2004 |
| EP | 1 881 688 A1 | 1/2008 |

(Continued)

OTHER PUBLICATIONS

International Search Report, PCT Application No. PCT/SE2008/050774, Mar. 12, 2009.

(Continued)

*Primary Examiner* — Matthew Gart
*Assistant Examiner* — Reva R Danzig
(74) *Attorney, Agent, or Firm* — Myers Bigel Sibley & Sajovec, P.A.

(57) ABSTRACT

Systems and methods according to these exemplary embodiments provide techniques for facilitating the selection of a billing gateway (120, 504) by an end user device (10, 20, 30) when an end user (10, 20, 30) orders content for the end user device or another device as desired.

11 Claims, 6 Drawing Sheets

(56) References Cited

U.S. PATENT DOCUMENTS

2008/0097882 A1* 4/2008 Rowe et al. .................. 705/35
2008/0103923 A1* 5/2008 Rieck et al. .................. 705/26

FOREIGN PATENT DOCUMENTS

| JP | 2001-344545 A | 12/2001 |
| JP | 2004-127121 A | 4/2004 |
| JP | 2004-145616 A | 5/2004 |
| JP | 2005-260518 A | 9/2005 |
| WO | WO 00/42581 A1 | 7/2000 |
| WO | WO 01/78316 A2 | 10/2001 |
| WO | WO 2006/010800 A1 | 2/2006 |
| WO | WO 2008/020123 A1 | 2/2008 |

OTHER PUBLICATIONS

Written Opinion of the International Searching Authority, PCT Application No. PCT/SE2008/050774, Mar. 12, 2009.
Extended European Search Report corresponding to EP 08 76 7240 related to PCT/SE2008/050774, dated Feb. 6, 2013, 6 pages.

* cited by examiner

DYNAMIC PAYMENT METHODS AND DEVICES

CROSS REFERENCE TO RELATED APPLICATION

This application is a 35 U.S.C. §371 national stage application of PCT International Application No. PCT/SE2008/050774, filed on 25 Jun. 2008, the disclosure and content of which is incorporated by reference herein in its entirety. The above-referenced PCT International Application was published in the English language as International Publication No. WO 2009/157830 A1 on 30 Dec. 2009.

TECHNICAL FIELD

The present invention relates, generally, to communications systems and, in particular, to methods and systems for allowing end user devices access to a plurality of billing gateways when requesting content or services from a provider.

BACKGROUND

Communications technologies and uses have greatly changed over the last few decades. In the fairly recent past, copper wire technologies were the primary mechanism used for transmitting voice communications over long distances. As computers were introduced the desire to exchange data between remote sites grew for many purposes, such as those of businesses, individual users and educational institutions. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for use, which in turn increases the need to continue to improve the available bandwidth for delivering these services, particularly as the quality of video and overall amount of content available for delivery increases.

As the consumer electronics industry continues to mature, and the capabilities of processors increase, more devices have become available for public use that allow for the transfer of data between devices and more applications have become available that operate based on this transferred data. Of particular note are the Internet and local area networks (LANs). These two innovations allow multiple users and multiple devices to communicate and exchange data between different devices and device types. For example, personal computers, laptop computers and cell phones can all access a variety of media content providers to exchange data and/or receive services. With the advent of these devices and capabilities, users increasingly desire to receive a variety of services over these networks.

As the quantity of user devices, service options and providers increase, the desire to efficiently provide users with access to content will increase, and the need for efficient billing methods associated with such desired content is also expected to grow. One mechanism associated with mobile phones for merging billing with a user's desire to gain access to services and/or applications is Ericsson's Internet Payment Exchange (IPX). IPX is a business agreement which allows for mobile phone users and content providers to have a predetermined method for billing when content is requested by a mobile user. IPX can act as a broker that in turn reutilizes various protocols, e.g., simple object access protocol (SOAP), short message peer-to-peer (SMPP) protocol and MM7, between operators and content companies. For example, if a mobile user were to download a ring tone from a content provider that uses IPX, instead of going through a slow, somewhat manual method for requesting and authorizing payment for the ring tone, the mobile phone user could be billed on their monthly bill from their mobile operator for the downloaded ring tone from the content provider. Additionally, these systems often require that the operator implement a billing system, which typically has not been done for wireline customers as it has been done for mobile customers, e.g., IPX.

As can be expected with continued growth in the computer industry, the telecommunications industry and the entertainment industry, significant overlap between various product/service usage exists and this overlap is expected to increase. This overlap leads to the desire to allow different types of end user devices, e.g., personal computers, laptop computers using either wireless or wireline connections and mobile phones, to be able to access content from a plurality of content providers that are not necessarily the end user's service providers. This content could include audio, video on demand (VoD), ringtones, weather updates and the like. It can be expected that the end user will want the option for a plurality of easy to use, secure billing options to be available to him or her when requesting content from a content provider, particularly for low cost, repetitive content.

For example, consider a user that is surfing the Internet and wishes to read a newspaper which has an online per view subscription charge of two dollars, and that the only way to pay this per view subscription charge is through a VISA or MasterCard credit card. The amount of time and effort needed to fill in all of the required information fields, possibly repeatedly for both the credit card company and the newspaper company, is a lengthy process for a two dollar charge and, potentially, a short read time for the newspaper article of interest. Additionally, this payment scheme inflexibility assumes that the end user has a VISA or MasterCard credit card. From an end user's perspective, a simpler system with multiple, user selectable billing options is desirable. Also, from a content provider's point of view, payment flexibility and automation could increase the potential markets and customers which use their service. Moreover, such flexibility and automation could be applied to services other than the identification of payment method alternatives Accordingly the exemplary embodiments described herein provide systems and methods for providing a plurality of payment/billing options to end users when requesting content for a device.

SUMMARY

Systems and methods according to the present invention address this need and others by providing systems and methods for providing a plurality of payment/billing options to end users when requesting content for a device.

According to one exemplary embodiment a method for selecting a billing gateway includes transmitting, by an end user device, a message which includes at least one of user introduced billing gateways and information associated with user introduced billing gateways, receiving, at an end user device, a list of billing gateways, wherein the list of billing gateways is based upon the at least one of user introduced billing gateways and information associated with the user introduced billing gateways, selecting one of the billing gateways from the list, and transmitting, by the end user device, a message which identifies the selected one of the billing gateways from the list for use in completing transactions with the end user device.

According to another exemplary embodiment a device includes: a user agent for requesting content and transmitting end user choices based upon received messages, a communications interface for transmitting and receiving messages associated with billing information associated with the requested content, including receipt of a list of billing gateways and transmission of selection of one of the billing gateways in the list, a memory for storing information related to the billing information associated with the requested content, and a processor in communication with the memory and the communications interface upon which the user agent operates, wherein the processor transmits, via the communications interface, a message which includes at least one of user introduced billing gateways and information associated with user introduced billing gateways, wherein the list of billing gateways is based upon the at least one of user introduced billing gateways and information associated with the user introduced billing gateways.

According to another exemplary embodiment, a computer-readable medium contains program instructions stored thereon which, when executed by a computer or processor, performs the steps of storing information associated with at least one payment method which is available to an end user device, the information including the end user's preferred list of billing gateways, and transmitting the information to a merchant as one of a hyper text transfer protocol (HTTP) header and a Uniform Resource Locator (URL).

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
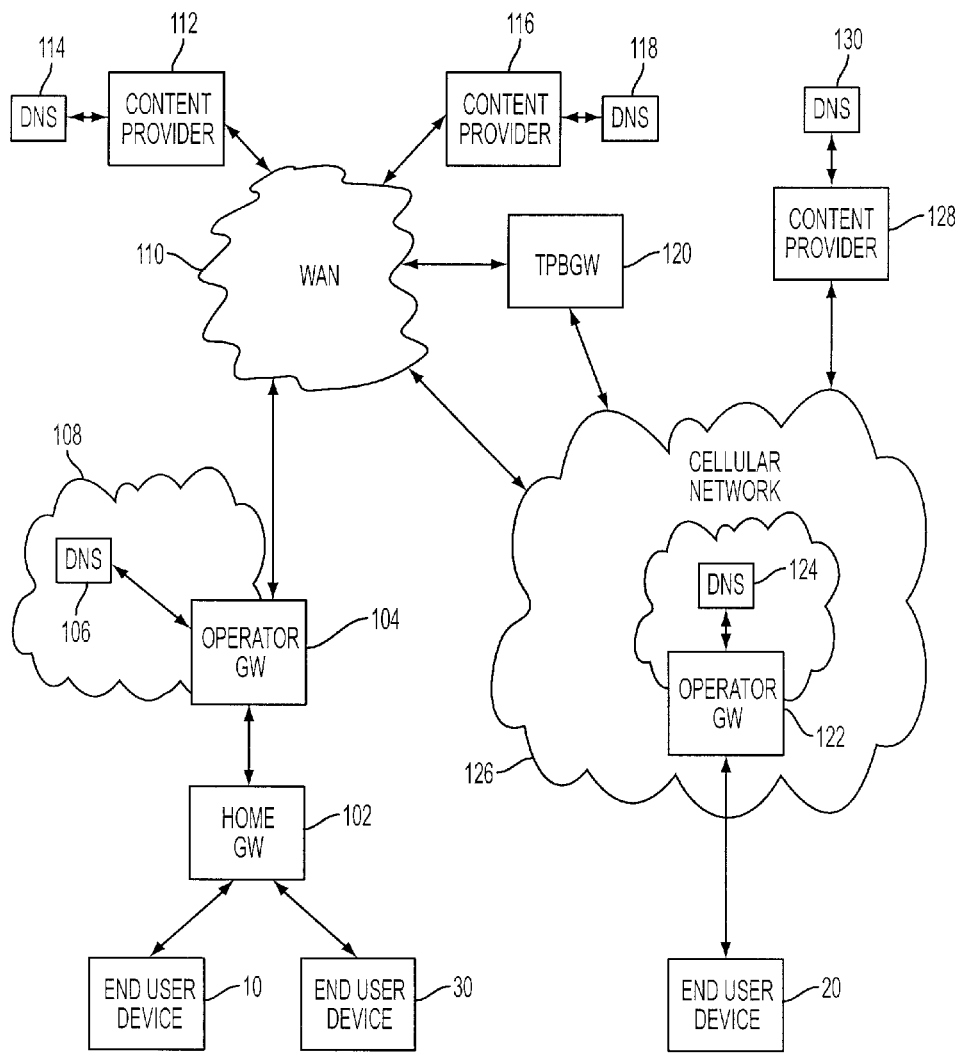
FIG. 1 illustrates a framework with which end user devices communicate with content providers according to exemplary embodiments.

As mentioned above, it is desirable to provide systems and methods for providing a plurality of payment or billing options to end users when requesting content or services, e.g., video, games, audio, ring tones, for a device. Additionally, increased flexibility in terms of the types of devices used and how they can be used is desirable. For example, a user might want his personal computer (PC) to be able to pay for his or her television subscription which is received by their set-top box (i). In order to provide some context for this discussion, an exemplary communications framework 100 is shown in FIG. 1 for providing communications to, for example, end user devices from various nodes, such as, content provider nodes. Exemplary end user devices 10, 20 and 30 that can be used to request content, and then to interact in the billing process for the content, include, but are not limited to, cell phones, laptop computers, PCs, STBs and other devices capable of receiving content, e.g., devices with web browsers.

According to exemplary embodiments as shown in FIG. 1, end user devices 10, 20 and 30 capable of requesting and receiving content, can communicate with a plurality of content providers 112, 116 and 128 through different interconnected communications networks. Some of the nodes involved with requesting/receiving content and the associated billing process are shown in FIG. 1 and will be explained below, however it will be appreciated that potentially numerous other nodes and communications links, such as routers in the Wide Area Network (WAN) 210 and base stations and/or eNodeBs in cellular network 126 while not shown, are understood to be present as needed. Additionally, cellular network 126 represents any of the various types and generations of cell phone networks used today or described in various documents and standards describing cellular networks.

In this exemplary system, end user devices 10 and 30, are in communication with home gateway (GW) 102 which could be a cable or digital subscriber line (DSL) modem, which in turn is in communications with an operator gateway (or node) 104. The operator GW 104 is in communications with its associated domain name system (DNS) server 106. Additionally, the operator 108 provides access to WAN 210 for the end user. WAN 110 can include numerous routers and nodes (not shown) for routing traffic between devices. Also, WAN 110 can have communication links which connect it with a variety of content providers 112 and 116 each of which has an associated DNS server 114 and 118, respectively. Communication links also exist between WAN 110 and cellular network 126. Cell phone 20 is in communications with operator gateway (or node) 122 which is in communications with its associated DNS server 124, both of which can be considered to be part of cellular network 126. Also in communications with cellular network 126 is a content provider 128 and its associated DNS server 128. Other additional nodes, such as a third party (TP) billing gateway (BGW) 120 can be in communications with WAN 110 and/or cellular network 126. These nodes have been described to show a purely exemplary physical framework for end user devices to request content or services and for transmitting/receiving billing information or payment according to exemplary embodiments.

Using the exemplary end user devices 10, 20 and 30 in the exemplary communications system shown in FIG. 1, content or services can be requested and billing or payment information can be gathered and exchanged. As used herein, the term "content" is generic to any content, service, delivery of goods, etc., which may be requested by an end user or end user device. When an end user orders content from a device, it is often desirable to have a variety of payment solutions for the end user to choose from that are preferable and/or acceptable to both the operator 108 and the content provider 112, 116 or 128. As used herein the term "preferred" is generic to payment methods which are accepted by one or more parties, and the subset of acceptable payment methods which are more preferable to one or more parties, e.g., based on an ordered ranking of acceptable payment methods. According to exemplary embodiments, systems and methods can be provided that allow the user to choose from multiple payment solutions each of which include a chain of trust between users, operator, billing system and content provider. Chains of trust, as used herein, describe accepted billing options from trusted sources between different entities. This, in part, can be based upon information gathered during the communications between end user, operator and/or content provider when requesting content.

In order to facilitate an orderly, yet flexible negotiation between some or all of the various parties involved in content delivery, e.g., an end user, a content provider and a service operator, exemplary embodiments of the present invention provide techniques and mechanisms in both the end user devices 10, 20 and 30, as well as on the network side. The end user side techniques and mechanisms can be used together with the network side techniques and mechanisms, or the two sets of features can be used independently of one another. In order to provide a full understanding of these various techniques and mechanisms, the end user side techniques and mechanisms will first be described primarily independently from the network side techniques and mechanisms will first be described independently, then the network side techniques and mechanisms will be described and finally several examples will be provided which illustrate their potential interaction.

End User Side

According to exemplary embodiments, a software application can be installed onto the various end user devices 10, 20 and 30 which, for example, interacts with the units' web browser to assist in streamlining the billing process. For example, the software application can be used to interact with queries from either the operator 108 or any content provider 112, 116 or 128 (also referred to herein as "merchants") for assisting in providing information used to create a list of potential billing gateways for that particular end user. According to exemplary embodiments, this software application, in conjunction with the memory and processor of the device, can allow the end user device 10, 20 and 30 to perform a number of functions regarding information that can be introduced into the payment chain. For example, the end user device 10, and 30 can maintain a list of preferred and/or blacklisted entities, e.g., billing gateways. The device 10, 20 and 30 can also maintain a list of alternative payment methods which can be transmitted to an operator 108 and content operators 112, 116 and 128 as needed. The device 10, 20 and 30 can maintain optional metadata regarding payments or payment transactions, e.g., metadata associated with currency conversion, contractual details, and pre-authorization information. The end user device 10, 20 and 30 can also maintain a set of records used to bootstrap or otherwise manage or assist in managing the chain(s) of trust. Still further, the end user device 10, 20 and 30 can be provisioned with branding information, such as logos pertaining to the payment exchange.

Some or all of these stored data elements can be introduced automatically into the payment chain by the end user device 10, 20 and 30 to help in reducing the time and effort in the billing process, especially for relatively inexpensive content requests, so as to reduce the burden on the end user. This data can, for example, be sufficient to identify a payment method to the point where the consumer is only one click away from authenticating herself and authorize the payment. Thus this data typically indicates such information as payment organization, payment service type, region etc., but could exclude, e.g., actual account ID and any authentication information.

The information described above, which is stored in the end user device 10, 20 and 30, can be provided to the network side in a variety of different ways. According to one exemplary embodiment, such information can be provided using hyper text transfer protocol (HTTP) headers in messages transmitted from the end user device 10, 20 and 30 toward the network. These HTTP headers can then be checked on the network side to determine if they point towards identifiable billing information, e.g., for example HTTP headers such as "eobgw:ipx, 127.0.0.1, 5577, UID" or "eobgw:mastercardpp, 19.1.2.3, 123, UID", where in this example, the header preamble "eobgw" refers to a billing gateway called Ericsson Open Billing Gateway as a purely illustrative example. These HTTP headers could be sent from the end user device 10, 20, 30 by the web browser at the direction of the added software application either standing by themselves, encapsulated in a post, cookie, user agent profile (UAProf) or the like. The term "post" in this context refers to the HTTP POST method, which allows an application to submit data from a browser to a server.

For example, upon entering a merchant's web pages via its web browser, the end user device 10, 20, 30 can present a set of additional HTTP headers to the merchant's server with information regarding alternative payment methods, payment preferences and/or payment methods which are not acceptable to the end user. The information can be provided in the form of URLs, cookies or HTTP headers. Consider the following example of a set of HTTP headers presented to a merchant's server by an end user device according to an exemplary embodiment.

Example 1

EOBGP: http://bgw.visa.com/uid, preference 1
EOBGP: http://bgw.b2.net/*, preference −1 (blacklist)
EOBGP: http://bgw.fsb.se/pnum, preference 2
EOBGP: http://bgw.paypal.com/06128@mail.com, preference 100

From this set of information provided by an end user's device 10, 20, 30, the merchant can determine a set of billing methods that is tailored to this specific user, including consideration of the preference order if provided. For example, the merchant's server could match the user's list against the merchant's own list of billing gateway possibilities, and select the highest ranked billing gateway found in both lists. The merchant's server can either make the selection of the billing gateway to use, e.g., returning a message to the end user device of "Press <PAY> to pay via paypal", or can return a list of billing gateways for the end user to select from. As an alternative to providing payment preference information directly to the merchant via, e.g., HTTP headers, the end user device 10, 20, 30 can alternatively send a URL to the merchant's server, which URL points to a location on the network where that end user's payment preference information is stored and can be accessed by the merchant's server.

The end user device 10, 20, 30 can present the payment method information either as a push mechanism, described above, or as a pull mechanism in response to a trigger or request from the content or service provider. For example, at a request from a merchant whose site is being browsed by the end user device 10, 20, 30, the end user device can send these URLs to the merchant (or the network server URL), to indicate those mechanisms for payment that she or he possesses or prefers. These URLs may also have a marker to indicate the customer's preference for each payment method, e.g., the numerical rankings exemplified above. The merchant receives this set of URLs, and matches it to his own list of URLs that he can accept as payment channels. The merchant's list may be rather long, and it need not be published or presented to the end user (albeit other exemplary embodiments described below provide for such publication mechanisms), since most of the entries in the merchant's list of potential billing gateways/payment methods would probably be irrelevant to a particular consumer. Among the matching list of payment methods supported by both parties, the merchant may now discard the ones that are the least attractive or least preferred, and only publish the preferred ones to this customer via his or her end user device 10, 20, 30. Optionally, the merchant may also add his most preferred payment method to the list, e.g., to promote/advertise it to end user. When the list of payment methods that can be used is completed, it is presented to the consumer who can choose from this list, and the merchant can redirect the consumer to her chosen billing gateway. In addition to simplifying payment from the end user's perspective, the merchant will be able to measure which payment methods are preferred in his market segment and act accordingly.

Triggers sent by the merchant or content provider toward the end user device to pull the payment information therefrom can be implemented in various forms according to these exemplary embodiments. For example, according to one exemplary embodiment, the trigger can be implemented as a javascript that can read the stored payment information from the end user device 10, 20, 30. This operation may, optionally, be conditional upon the approval of the end user. Using a javascript as a trigger for pulling payment method information provides the additional advantage that it can embed such information in forms, AJAX communications or similar "out of band" signaling, along with the trigger itself. According to another exemplary embodiment, a special metatag can be used as the trigger to pull the payment method information from the end user device. For example the meta tag <meta http-equiv="EOBGW" content="http://URL"> could be sent to the end user device, which meta tag would trigger a redirect to the specified URL with the additional, e.g., payment method related, data embedded in HTTP headers or cookies.

Figure 2:
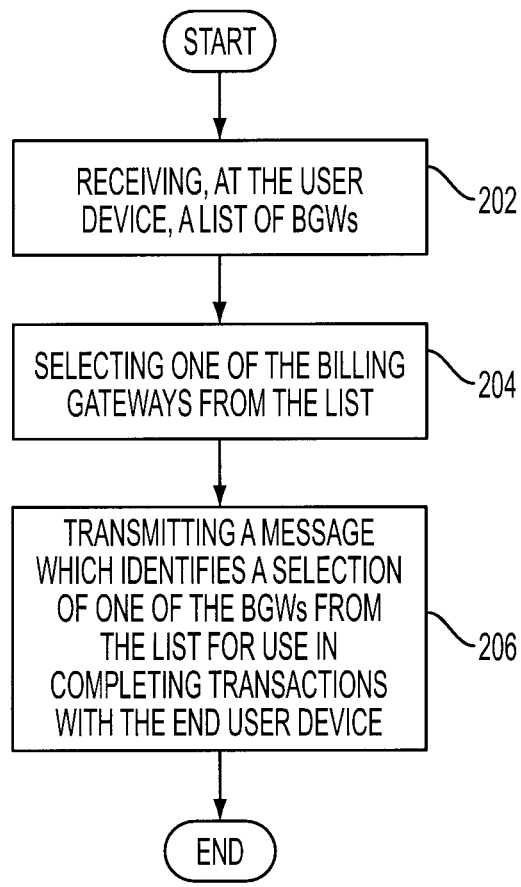
FIG. 2 illustrates a method flowchart for selecting a billing gateway according to exemplary embodiments.

Based on the foregoing, exemplary techniques for managing end user payment method information and selection of an appropriate billing gateway for payment to a particular merchant or content provider, it will be appreciated that a general method for selecting a billing gateway according to an exemplary embodiment, e.g., by an end user device, is illustrated in the flowchart of FIG. 2. As shown therein, an end user device 10, 20, 30 receives a list of billing gateways in step 202, e.g., which list is compiled using any or all of the techniques described above. At step 204, the end user and/or end user device selects one of the billing gateways from the list. This selection is then transmitted by the end user device, as indicated by step 206, e.g., by transmitting a message which identifies a selection of one of the billing gateways from the list for use in completing transactions with the end user device. If desired, the end user device 10, 20, 30 can initially transmit a message which includes at least one of user introduced billing gateways and information associated with user introduced billing gateways, such that the list of billing gateways which is subsequently received by that end user device is based, at least in part, upon either the user introduced billing gateways or information associated with the user introduced billing gateways.

Figure 3:
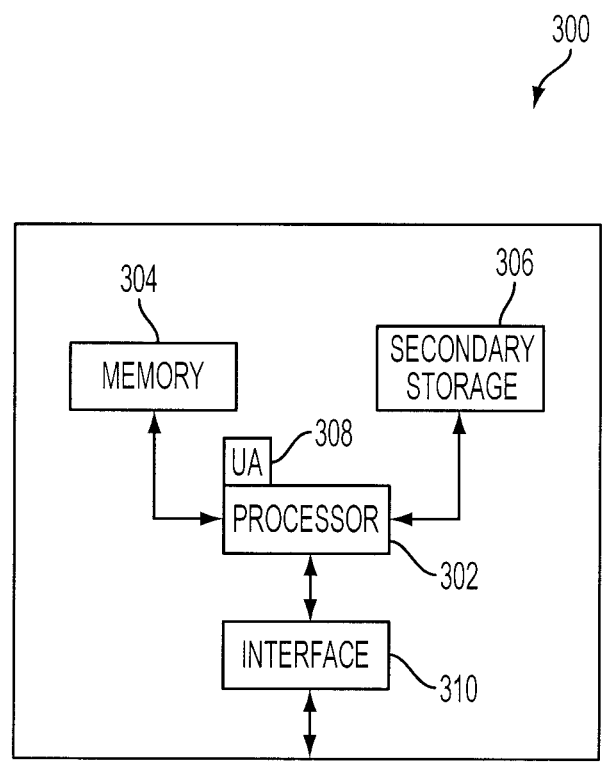
FIG. 3 illustrates an end user device or a communication node, according to exemplary embodiments.

Thus, a device 300, e.g., an end user device, according to an exemplary embodiment is shown in FIG. 3. Therein, a user agent 308 operates as the above-described software application for requesting content and transmitting end user choices based upon received messages, as described above. A communications interface 310 transmits and receives messages associated with billing information associated with the requested content, including receipt of a list of billing gateways and transmission of selection of one of the billing gateways in the list. A memory 304 stores various information related to, e.g., payment preferences, for the requested content. A processor 302, in communication with the memory 304 and the communications interface 310, and upon which the user agent 308 operates, coordinates the activities of the end user device 300.

Network Side

Having now described, at least primarily, exemplary embodiments associated with the end user devices 10, 20, and 30, the discussion now turns to exemplary techniques and mechanisms which can be used in the network side to facilitate the negotiation of and/or selection of a payment method or billing gateway. As will be pointed out below, however, some of the following exemplary embodiments may be used to implement the selection or location of services other than those associated with payment, e.g., video delivery services or other services.

As mentioned above in the discussion of end user techniques, an end user device 10, 20, 30 may provide a content provider 112, 116, 128 with information associated with that user's payment method preferences and/or capabilities. However, according to other exemplary embodiments, it may be left to the network side to determine the payment methods which are available to that end user device and/or his or her ISP/operator 104, 122. In such a case, the network side may only have, as a starting point for determining potential payment options, the consumer's IP address. According to the following exemplary embodiments, using the consumer's IP address, the merchant or content provider 112, 116, 128 makes a reverse DNS lookup. It will be appreciated by those skilled in the art that a reverse DNS lookup involves using a known IP address is to look up the host and domain name belongs to that IP address, e.g., by using a pointer (PTR) record stored in a DNS. The PTR record maps the IP address to the canonical host/domain name. If the ISP/operator associated with this particular end user device 10, 20, 30 offers payment methods and has registered these payment methods in the DNS 106, 124, the DNS 106, 124 returns URL(s) to the supported payment gateway(s) to the requesting content provider 112, 116, 128. These URLs may also point toward various partners to the ISP/operator that may add value to the payment service (for example, payment methods which credit the user with air "mileage" for purchases made using a particular payment method) and, therefore, create business for such actors. Since these exemplary embodiments are based on DNS, they enable identification of potential payment methods which will be acceptable both to the merchant and to the end user 10, 20, 30 with little or no configuration in the associated web terminal, handheld terminal or fixed device. In order to clarify the roles and associated nomenclature used herein, the term "operator" shall refer to, for example, the ISP or other party that owns and/or operates the DNS on which searches are performed, the term "end user" shall refer to a consumer or end user buyer of content, services or delivery of goods, the term "content provider" shall refer to the party which is the merchant or seller of the content, services or goods being requested by the end user and which may be the party which initiates the reverse DNS, and the term "payment provider" or "clearing house" shall refer to a third party which cooperates with the operator to provide services. The content provider may be both the seller of the content, services and/or goods as well as the provider of those services and/or goods or not. The entity which is providing the content, services and/or goods to the end user is referred to herein as a "service provider", regardless of whether that entity is also the content provider or not.

To better understand these exemplary embodiments, consider the following, purely illustrative, example. Suppose that when an end user uses device 10 connects to an operator 208, end user device 10 receives a public IP address (sometimes known as an Internet address or a WAN assigned IP address) of 130.13.97.55. This IP address resolves, in this example, to vdsl-130-13-97-55.phnx.quest.net. The end user then decides to order content, e.g., a ring tone to be downloaded to his or her mobile phone, from content provider 212. The content provider 212 performs a search using DNS server information to find a billing gateway that is authoritative for this specific IP address. The operator 204 then performs a lookup for the text record (TXT) associated with vdsl-130-13-97-55.phnx.quest.net and looks for identifiable billing information. If the identifiable billing information is not found in that address, the content provider 212 may perform a less exact match by, for example, searching phnx.quest.net for the text record, and iterates this search until only the top domain remains. The search can also be performed on a pure IP address, e.g., by trying to find the TXT record at 55.97.13.130.in-addr.arpa and, if not found, scaling 55, 97 and 13 as needed. Identifiable billing information can include, but is not limited to, protocol information, IP address/port of a BGW independent of protocol and multiple BGWs with different protocols.

Once all of the DNS searches are complete, the content provider 212 can connect to each of the billing providers identified as a result of the searches through their respective BGWs and determines what chains of trust, if any, exist between each billing provider and content provider 212, operator 204 and end user device 10 (identified with a specific IP address and associated with a specific end user). If the end user has a list of billing gateways, and the content provider has trusts with a different set of billing gateways, it would be possible to ask recursively each of the user's billing gateways for a trusted path from one of the content provider's billing gateways to the customer. For example, an end user might have a MasterCard, an account with operator 208, an account with Citizens Bank and an account with a local credit union. The operator 208 has an account associated with the end user, allows MasterCard, VISA and Citizens Bank. The content provider 212, recognizes MasterCard, VISA and the operator 208. Using the search results and the determined chains of trust, a list of potential billing providers is assembled, e.g., a list including MasterCard and the operator 208. This list is then sent to end user device 10 for the user to choose a desired billing provider. Upon selection of the desired billing provider, the user is redirected to the billing gateway of the selected billing provider for concluding the billing verification. Also at this point, optional authorization for future billing with this content provider can be set up. Upon completion of this billing step, the end user is redirected back to the content provider 212 so that the content provider can either send the content or a receipt for goods to be transmitted.

According to the foregoing exemplary embodiment, a content provider 212 can perform a DNS search (or reverse DNS search) to identify payment methods/billing gateways that may be mutually acceptable both to itself and an end user 10, 20, 30. According to other exemplary embodiments, therefore, it may be useful to provide an operator with techniques for publishing its accepted or offered payment methods to a DNS 106, 124. By publishing, for example, the URL(s) and any supplementary metadata associated with its supported payment gateway(s) in its DNS, the operator can make this information easily accessible to any external party, e.g., to facilitate the aforedescribed searches by a content provider. According to this exemplary embodiment, these URL(s), and any supplementary metadata can include not only the operator's own billing system, which may support payments to a third party, but may also include other payment providers that the operator and its subscriber base are affiliated with. This list of URL(s) thus represents a set of payment providers that are available to members of the subscriber base. This, in turn, would, for example, provide an opportunity for an operator to offer an alternative to its basic billing system, e.g., where the end user can be offered the alternative to pay his or her operator's service bill with a percentage surcharge that is then sent to a selected charity.

The modification of, or adding to, DNS records to provide for publishing an operator's accepted or preferred payment methods can be performed in any desired way according to these exemplary embodiments. For example, an operator 104, 122 can enter, e.g., TXT records in its respective DNS 106, 124, identifying the supported payment gateways. If multiple syntaxes or standards exist for such payment gateways, the operator 104, 122 can enter all such syntaxes or only the ones that it wants to support.

As mentioned earlier, these exemplary network side embodiments are not limited to publication of, and searching for, payment methods but can, instead, be applied to the publication of, and searching for, other types of services. For example, in the context of video services, e.g., IPTV, a content provider 112 may prefer to send video content to a caching server (not shown) instead of directly to an end user device 10, 20, 30. To determine whether and where such a caching server is located for a particular end user device 10, the content provider 112 may query the DNS 106 of that end user's operator 104. If the operator 104 has published the identity/address of its caching server for such video content in its DNS 106 (or the caching server has registered itself therein), then the content provider 112 will obtain this information and send the video content requested by the end user to the caching server for subsequent delivery to the end user device 10. More generally, the DNS 106, 124 can operate as service brokers for any and all types of services which opt to register themselves therein, thereby removing constraints associated with, e.g., requirements for pre-negotiated agreements for services.

Figure 4:
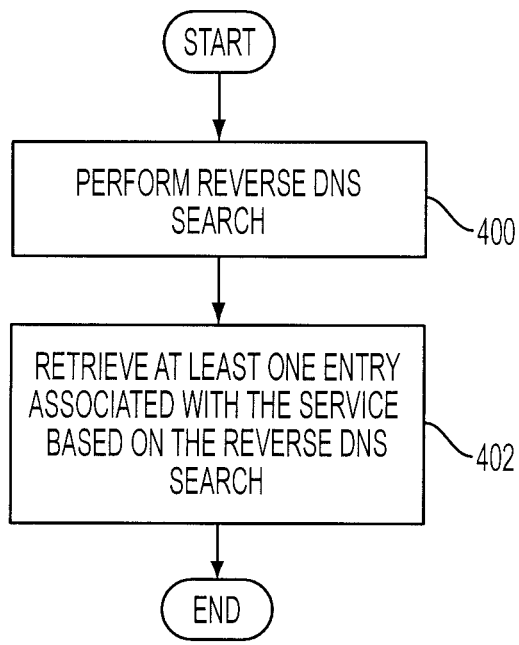
FIG. 4 is a method flowchart illustrating a method for locating a service according to exemplary embodiments.

Based on the foregoing, exemplary techniques for managing network side location of services, e.g., payment method information, it will be appreciated that a general method for locating a service according to an exemplary embodiment is illustrated in the flowchart of FIG. 4. As shown therein, a method for locating a service of a particular type provided by a service provider includes the step 400 of performing a reverse domain name server (DNS) search, e.g., based on an IP address of an end user device of interest for the particular service. Then, at step 402, at least one entry associated with the service is retrieved from a DNS associated with the service provider based on the reverse DNS search.

Similarly, a network node which can implement these network side exemplary embodiments can, generally, be described with respect to FIG. 3 (also used above to describe a generic end user device). Such a network node can include, for example, a processor 302 which locates a service of a particular type provided by an operator 104, 122 by performing a reverse DNS search and retrieving at least one entry associated with the service from a DNS (106, 124) associated with the operator.

Although the foregoing examples have been provided in the context of locating payment services, it will be appreciated that these embodiments are not limited to the location/provision of payment services and may, in fact, be applied to any type of services which can be located via reverse DNS searching. For example, other services which could be located in the aforedescribed manner include: (1) finding a positioning server which is able to provide the location of an end user, e.g., via GPS, TOA, TDOA, and/or other location based services, (2) finding a server for end user profile data, (3) finding a DRM server (e.g., to locate keys), and (4) finding available media resource servers. Moreover, although the foregoing examples describe that the DNS reverse searches may be initiated by the content provider, the reverse DNS search may be performed by any party interested in finding a desired service including, for example, a service provider, operator or even the end user, e.g., to enable the end user to locate his or her own DRM server on a network.

Exemplary Interactions

As mentioned earlier, the above-described end user techniques and network side techniques can be used independently of one another or together according to these various exemplary embodiments. To better understand these exemplary embodiments, some exemplary interactions between the end user side and network side techniques will now be presented in conjunction with the exemplary signaling diagram of FIG. 5. This purely illustrative signaling diagram depicts the signals involved for an end user 502 to receive a list of potential operator's billing gateways (BGWs) and use a selected one (in this example BGW 504) of those BGWs to perform subsequent payment processes with a particular content provider or merchant.

Figure 5:
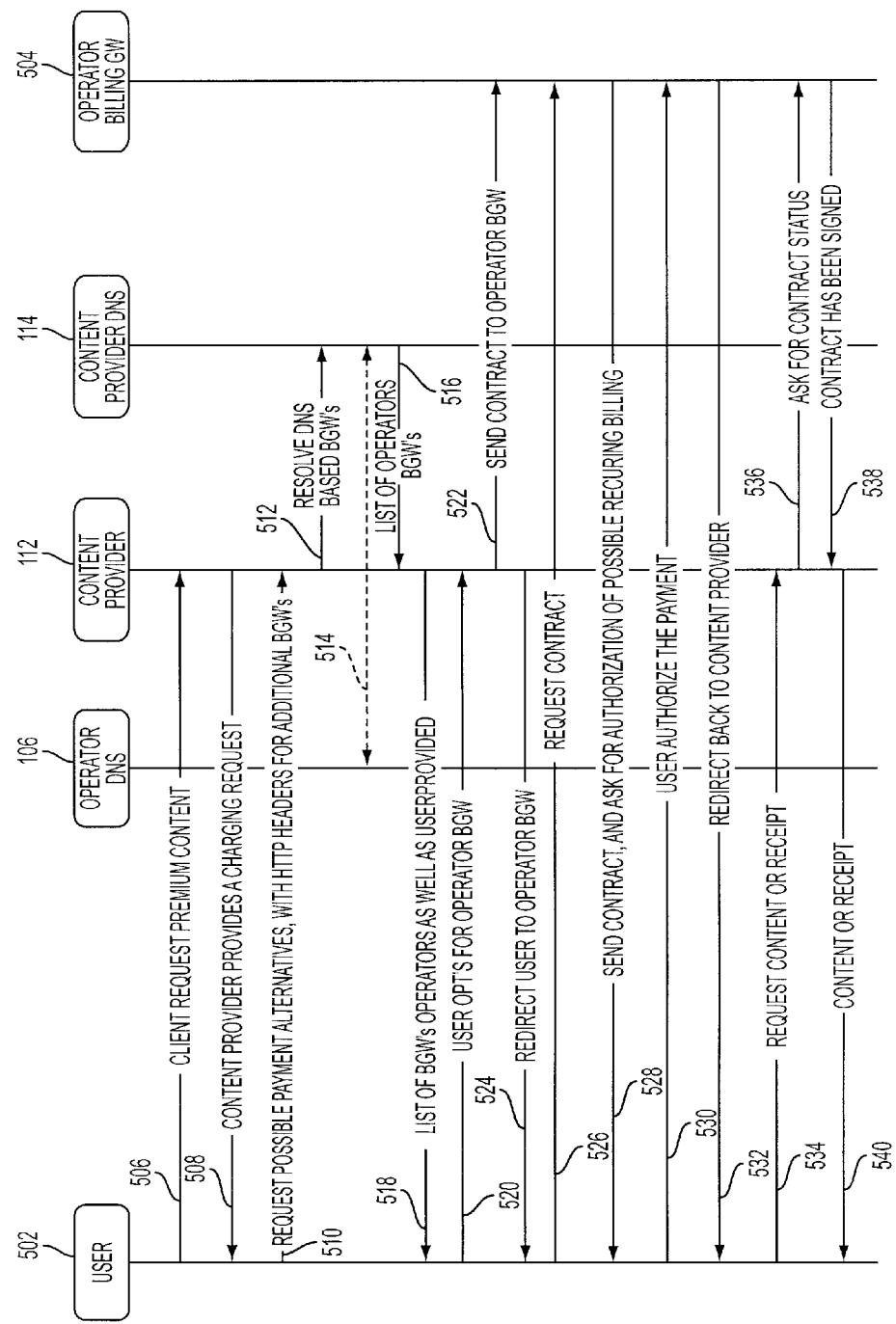
FIG. 5 shows a call flow diagram for using an operator billing gateway (BGW) according to exemplary embodiments.

Typically, at the point in time where the signaling diagram of FIG. 5 starts, the end user device 10 will have already connected to a network through their operator 108 and received a unique identifier, e.g., a WAN assigned IP address. Initially, suppose that user 502 requests premium content for a device 10 from a content provider 112 in message 506. Content provider 112 replies with a charging request in message 508. The user 502 optionally responds with possible payment alternatives as well as user recommended BGWs embedded, for example, in HTTP headers or as a cookie(s), in message 510. Next the content provider 112 in conjunction with its associated DNS server 114 and the operator's DNS server 106 perform a search, as described above using DNS, reverse DNS techniques, and HTTP headers, etc., to resolve DNS based BGWs as shown in signals 512 and 514. A list of the operators' BGWs is then sent to the content provider 112 in message 516. The various BGWs that have been found through the search and/or directly provided by the user 502, operator 108 and content provider 112 are then merged and sent to the user 502 in message 518.

In this example, the user 502 selects the operator's BGW 504 as the desired BGW for use and transmits this information to the content provider 112 in message 520, which then sends a contract to the operator BGW 504 in message 522. The content provider 112 also redirects the user to the operator BGW 504 as shown by message 524. The user 302 then requests the contract from the selected operator BGW 504 in message 526. The operator BGW 504 sends the user 502 a contract for the desired content and, optionally, sends an authorization request for possible recurring billing in message 528. The user 502 then authorizes payment in message 530. Operator BGW 504 then redirects the user 502 back to the content provider 112 in message 532. User 502 then requests the selected content from content provider 112 or a receipt for the content to be transmitted in message 534. The content provider then performs a verification of the contract status with the operator BGW 504 as shown in messages 536 and 538. At this point, either the receipt or the content is sent from content provider 112 to the user 502 as shown by message 540.

Figure 6:
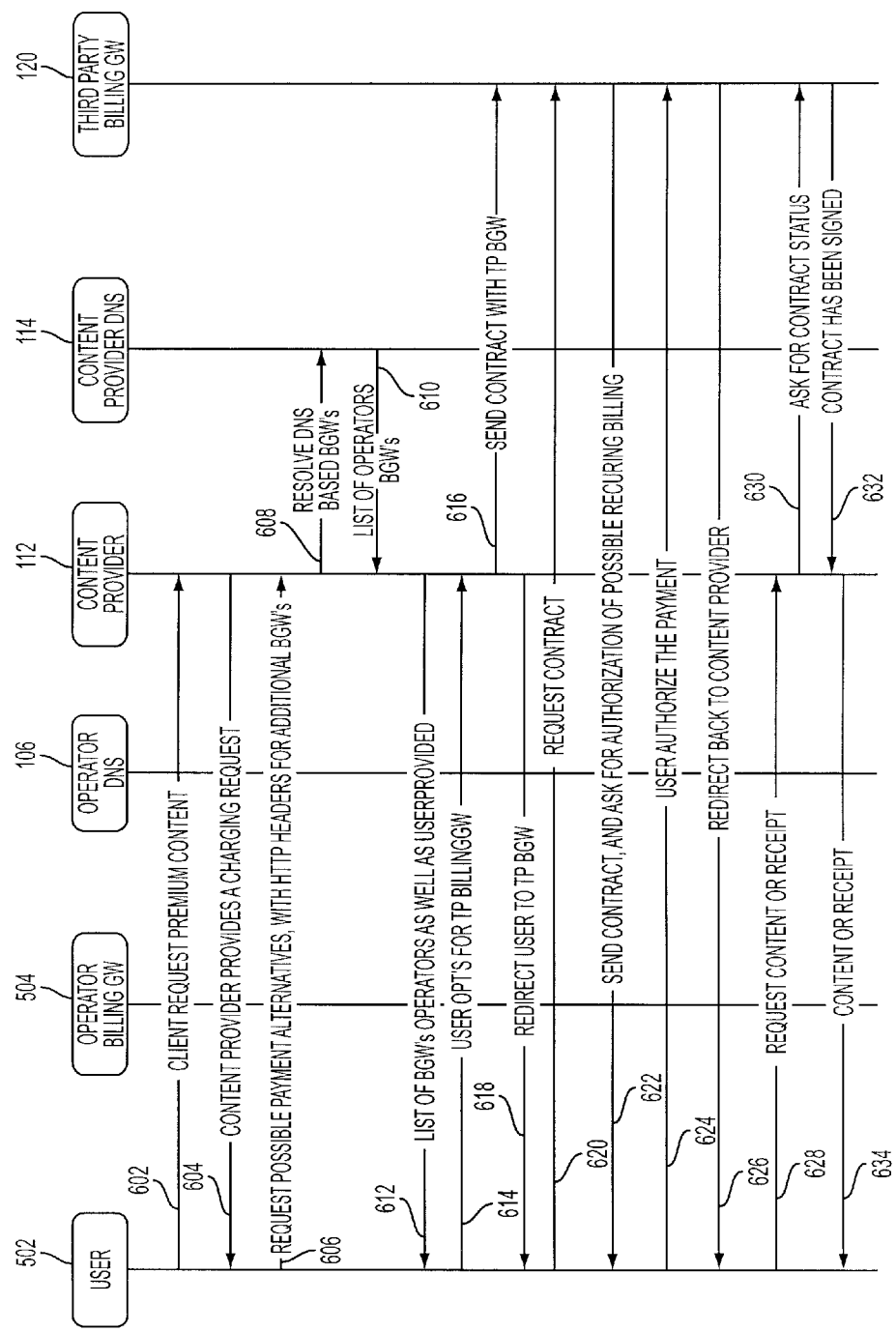
FIG. 6 illustrates a call flow diagram for using a third party BGW according to exemplary embodiments.

According to another exemplary embodiment, involving third party (rather than operator) billing gateways, an exemplary signaling diagram depicting the signals involved for an end user 502 to receive a list of potential billing gateways (BGWs) and use a third party BGW is shown in FIG. 6. Therein, operator BGW 504 is shown purely for comparison purposes to FIG. 5 but receives no communications in the example shown in FIG. 6. Typically, the end user device 10 will have already connected to a network through their operator 108 and received a unique identifier, e.g., a WAN assigned IP address, at the time at which the signaling begins in FIG. 6.

Initially, user 502 requests premium content for a device from a content provider 112 in message 602. Content provider 112 replies with a charging request in message 604. The user 502 optionally responds with possible payment alternatives as well as user recommended BGWs embedded, for example, in HTTP headers or as a cookie(s), in message 606. Next the content provider 112 in conjunction with its associated DNS server 114 performs a search, as described above using DNS, reverse DNS techniques, and HTTP headers, etc., to resolve DNS based BGWs as shown in signal 608. These results, e.g., a resolved list of operator BGWs, are transmitted to the content provider 112 in message 610. The various BGWs that have been found through the search and/or have been directly provided by the user 502, operator 108 and content provider 112 are then merged and sent to the user 502 in message 612.

In this example, the user 502 selects a third party BGW 120, e.g., a billing gateway associated with VISA, from the received list and transmits this information to the content provider 112 in message 614, which then sends a contract to the third party BGW 120 in a message 616. The content provider also redirects the user to the third party BGW 120 as shown by message 618. The user 502 then requests the contract from the selected third party BGW 120 in message 620. The third party BGW 120 sends the user 502 a contract for the desired content, and optionally sends an authorization request for possible recurring billing in message 622. The user 502 then authorizes payment in message 524. Third party BGW 120 then redirects the user 502 back to the content provider 112 in message 626. User 502 then requests the selected content from content provider 112 or a receipt for the content to be transmitted in message 628. The content provider then performs a verification of the contract status with the third party BGW 120 as shown in messages 630 and 632. At this point, either the receipt or the content is sent from content provider 112 to the user 502 as shown by message 634.

As shown in FIG. 6, content provider 112 sends message 604 to user 502 providing a charging request. According to exemplary embodiments, other information can be included in the response message 606 from the user. For example, an IP address for each of the user provided BGWs can be included. Also, a customer identification which identifies the customer to each of the provided BGWs can be provided, e.g., users' account information, a personal identification number (PIN), or the like, as well as the protocols used by each of the user provided BGWs to facilitate data exchanges between the content provider 112 and any of the user provided BGWs.

According to exemplary embodiments, the list of BGWs presented to the end user 502 can be modified in various ways. For example, the content provider 112 can take the list of BGWs provided by the user 502 and recursively ask each of the user's 502 submitted BGWs for a trusted path from one of the content provider's 112 billing gateways to the customer. In any case where a trusted path cannot be established, the corresponding BGW could be removed from the list, marked appropriately to denote this lack of trusted path or otherwise identified. Additionally, the list can be presented or ranked in terms of most desirable to least desirable (or vice versa) from either the user's 502 point of view or the content provider's 112 point of view. For example, different third party BGWs may impose various service charges and the user 502 could set his or her preferences such that the lowest surcharge BGWs should be listed first. Another method for prioritizing this list would be to provide, e.g., at the top of the list, BGWs that are never to be used. Other methods for prioritizing this list could be used as desired by either the end user 502 and/or the content provider 212. According to one exemplary embodiment, the software downloaded to the end user device 502 can be used in setting up and storing a list of BGWs preferred by the end user 502.

Utilizing the above described systems and methods an exemplary embodiment for quickly and easily selecting a BGW will now be described. Consider a user 502 that is surfing the Internet and wishes to read a newspaper with a subscription charge of two dollars. The user 502 has an exemplary software application that interacts with his web browser that is surfing the Internet. Additionally, a chain of trust has been previously established between the user 502, the newspaper company and a number of billing gateways. Using previously stored preferences, when the user 502 chooses to select the newspaper for reading, the user 502 is steered to the desired billing gateway, in this case, the billing gateway of his Internet Service Provider. The user 502 is asked to enter a PIN for account verification. Upon acceptance of the user entered PIN, the user 502 is redirected to the newspaper company's website, where the user 502 can now read the selected newspaper at his leisure.

Billing gateways, as the phrase is used herein, describe entities or nodes which mediate the process of collecting and handling billing data associated with, e.g., communication systems or services. For example, a billing gateway which supports multiple vendors makes the collection and handling of billing data simpler and more efficient as described above and by providing Customer Administrative Systems (CAS) with one uniform and stable standard interface for all billing data collection. This results in a less complex network for billing data collection, minimizes implications during upgrades, and cuts costs for integration of new Network Elements (NEs) or post processing systems. The billing gateway collects Call Data Records (CDRs), Internet Protocol (IP) records, and other Usage Data Records (UDRs, i.e., logs and event records from IP nodes), automatically, and online from various types of NEs. The CDRs can be processed in the billing gateway before delivery to their final destination.

The billing gateway can be implemented, according to some exemplary embodiments, as a client-server architecture with a user-friendly, portable Graphical User Interface (GUI), which makes configuration of the billing gateway straightforward. For example, the operator's personnel can use the GUI to specify how CDRs are collected, how to process CDRs and where to distribute the CDRs. The billing gateway according to these exemplary embodiments supports, for example, the simultaneous use of collection of charging data produced from different network architectures e.g., Global System for Mobile Communication (GSM), General Packet Radio System (GPRS), Wideband Code Division Multiple Access (WCDMA), and IP networks, and different NEs from different product lines, releases, and vendors. The flexible processing capabilities offered by the billing gateway make it easy to charge for new services and minimize the changes to the billing system. The billing gateway not only simplifies changes and growth in network size and services, it also supports: conversion between different formats, processing of billing data, improved fraud detection possibilities, and distribution of billing data using a number of standard protocols.

Among other things, billing gateways provide some or all of the following exemplary functionalities: collection, communication daemon, content manager, external agent, near real time charging for collection, database interface (database NE), processing, formatting, filtering, consolidation module, rating and number analysis, look-up, configuration, supervision, advanced configuration toolkit, alarm handling, logging, distribution, near real time charging for distribution, database interface (database post processing system), high availability, cluster, disaster recovery cluster and redundant servers.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for selecting a billing gateway comprising:
  receiving from a user, by an end user device via a user interface, information identifying at least one user introduced billing gateway,
  wherein the user introduced billing gateway comprises a payment method associated with the user's preference for payment to a merchant;
  transmitting, by the end user device, a first transmit message which includes the at least one user introduced billing gateway;
  receiving, at the end user device, in response to the first transmit message, a list of two or more billing gateways, wherein said list of two or more billing gateways is generated to include at least one of said at least one user introduced billing gateway responsive to receipt from the user;
  selecting one of said billing gateways from said list; and
  transmitting, by said end user device, a second transmit message which identifies said selected one of said billing gateways from said list for use in completing transactions with said end user device.

2. The method of claim 1, further comprising:
  requesting, by said end user device, content; and
  receiving, at said end user device, a charging request associated with said requested content prior to said step of receiving a list of two or more billing gateways.

3. The method of claim 2, further comprising:
  receiving, at said end user device, a first receive message including redirection information to said selected said one of said billing gateways;
  receiving, at said end user device, a contract associated with said requested content from said selected billing gateway;
  receiving, at said end user device, a second receive message including information for redirecting message traffic to a content provider of said requested content;
  requesting, by said end user device, at least one of said content and a receipt associated with said content; and
  receiving, at said end user device, at least one of said content and said receipt.

4. The method of claim 1, wherein said list of two or more billing gateways includes one or more operator billing gateways or one or more domain name server resolved billing gateways.

5. The method of claim 1, further comprising:
requesting, by said end user device, payment alternatives.

6. The method of claim 1, further comprising:
selecting, by said end user device, a billing gateway for content to be received at another end user device.

7. The method of claim 1, further comprising:
receiving, at a communication node associated with a service provider, said at least one of user introduced billing gateway, and
selecting, by said communication node, one or more billing gateways to include in said list based, at least in part, on said at least one user introduced billing gateway.

8. A device comprising:
a user agent for requesting content and transmitting end user choices based upon received messages;
a communications interface for transmitting and receiving messages associated with billing information associated with said requested content, including receipt of a list of two or more billing gateways and transmission of selection of one of said billing gateways in said list;
a memory for storing information related to said billing information associated with said requested content; and
a processor in communication with said memory and said communications interface upon which said user agent operates,
wherein said processor receives, from a user via the user agent, at least one user introduced billing gateway,
wherein the user introduced billing gateway comprises a payment method associated with the user's preference for payment to a merchant,
wherein said processor transmits, via said communications interface, a message which includes the at least one user introduced billing gateway, wherein said list of billing gateways is generated to include at least one of said at least one user introduced billing gateway responsive to receipt from the user,
wherein said user agent maintains at least one of: operational metadata associated with payments and payment transactions, and information associated with a billing chain of trust.

9. The device of claim 8, wherein said list of two or more billing gateways includes one or more operator billing gateways or one or more domain name server resolved billing gateways.

10. The device of claim 8, wherein said device is one of: a mobile phone, a computer, and a set top box.

11. The device of claim 8, wherein said processor transmits, via said communication interface, a message which identifies a billing gateway for content to be received at another end user device.

* * * * *